United States Patent
Sidhpura et al.

(10) Patent No.: US 11,138,102 B2
(45) Date of Patent: Oct. 5, 2021

(54) READ QUALITY OF SERVICE FOR NON-VOLATILE MEMORY

(71) Applicant: Intel Corporation, Santa Clara, CA (US)

(72) Inventors: Sagar S. Sidhpura, Folsom, CA (US); Yogesh B. Wakchaure, Folsom, CA (US); Aliasgar S. Madraswala, Folsom, CA (US); Fei Xue, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/726,796

(22) Filed: Dec. 24, 2019

(65) Prior Publication Data
US 2020/0133839 A1 Apr. 30, 2020

(51) Int. Cl.
| | |
|---|---|
| *G06F 12/0882* | (2016.01) |
| *G06F 12/02* | (2006.01) |
| *G06F 9/38* | (2018.01) |
| *G06F 13/16* | (2006.01) |
| *G06F 9/54* | (2006.01) |

(52) U.S. Cl.
CPC ........ *G06F 12/0246* (2013.01); *G06F 9/3869* (2013.01); *G06F 9/546* (2013.01); *G06F 12/0882* (2013.01); *G06F 13/1673* (2013.01); *G06F 2212/214* (2013.01)

(58) Field of Classification Search
None
See application file for complete search history.

(56) References Cited

U.S. PATENT DOCUMENTS

| | | | | |
|---|---|---|---|---|
| 6,877,052 | B1* | 4/2005 | Osborne | G06F 13/364 710/105 |
| 9,069,702 | B2* | 6/2015 | Pisek | G06F 12/02 |
| 9,830,106 | B2* | 11/2017 | Le | G06F 12/0802 |
| 2007/0147120 | A1 | 6/2007 | Kim | |
| 2011/0208905 | A1 | 8/2011 | Shaeffer et al. | |
| 2019/0220218 | A1* | 7/2019 | Deshe | G06F 3/061 |
| 2019/0243577 | A1 | 8/2019 | Pelster et al. | |
| 2019/0317697 | A1* | 10/2019 | La Fratta | G06F 3/0679 |
| 2020/0133511 | A1* | 4/2020 | Mcgrath | G06F 3/068 |

OTHER PUBLICATIONS

Extended European Search Report for Patent Application No. 20197346.8-1203, dated Apr. 12, 2021, 6 pages.

* cited by examiner

*Primary Examiner* — Elias Mamo
(74) *Attorney, Agent, or Firm* — Compass IP Law PC

(57) ABSTRACT

A method and apparatus to reduce read latency and improve read quality of service (Read QoS) for non-volatile memory, such as NAND array in a NAND device. For read commands that collide with an in-progress program array operation targeting the same program locations in a NAND array, the in-progress program is suspended and the controller allows the read command to read from the internal NAND buffer instead of waiting for the in-progress program to complete. For read commands queued during an in-progress program that is processing pre-reads in preparation for a program array operation, pre-read bypass allows the reads to be serviced between the pre-reads and before the program's array operation starts. In this manner, read commands can be serviced without suspending the in-progress program. Allowing internal NAND buffer reads and enabling pre-read bypass reduces read latency and improves Read QoS.

17 Claims, 11 Drawing Sheets

READ QUALITY OF SERVICE FOR NON-VOLATILE MEMORY

FIELD

This disclosure relates to block-addressable non-volatile memory and, in particular, to read quality of service for block-addressable non-volatile memory.

BACKGROUND

Non-volatile memory refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid-state drive (SSD).

The non-volatile memory can comprise a block-addressable memory device such as NAND, or more specifically, multi-threshold level NAND flash memory (for example, Single-Level Cell ("SLC"), Multi-Level Cell ("MLC"), Quad-Level Cell ("QLC"), Tri-Level Cell ("TLC"), or other types of NAND).

In NAND flash memory the memory cells can be arranged in rows and columns to form a non-volatile memory array referred to as a NAND array. Transistors are connected in series with adjacent cells sharing a source and a drain. Vertical strings of series-connected transistors are attached to bit lines (BLs), the wires connecting the columns. The control gates of the transistors connected across different strings constitute a word line (WL) to form the rows.

A page of NAND flash memory is a set of BLs linked with the same WL. A page in a 2 Gigabit (Gb) SLC NAND flash die is 2112 bytes (2048 bytes of data and 64 bytes of metadata). The SLC NAND flash die can have 2048 blocks, with each block having 64 pages. Data is read and written (programmed) page by page and erased block by block.

An MLC NAND flash memory includes two pages (upper, lower) per WL, a TLC NAND flash memory includes three pages (extra, upper, lower) per WL and a QLC NAND flash memory includes four pages (top, extra, upper, lower) per WL. The pages per WL can be referred to as a linked page group.

A WL in a sub-block of a block-addressable NAND device can be used to program multiple pages worth of data. For example, a WL in a sub-block of a block-addressable QLC NAND device can be used to program four pages worth of data as compared to a TLC NAND device, in which the WL can be used to program only three pages worth of data.

While the QLC NAND technology offers significant cost savings, the time required to program QLC NAND increases significantly as compared to TLC NAND because of the increase in the density of data programmed per cell.

BRIEF DESCRIPTION OF THE DRAWINGS

The described embodiments are illustrated by way of example and not limitation in the figures of the accompanying drawings, in which like references indicate similar elements and in which.

Figure 1:
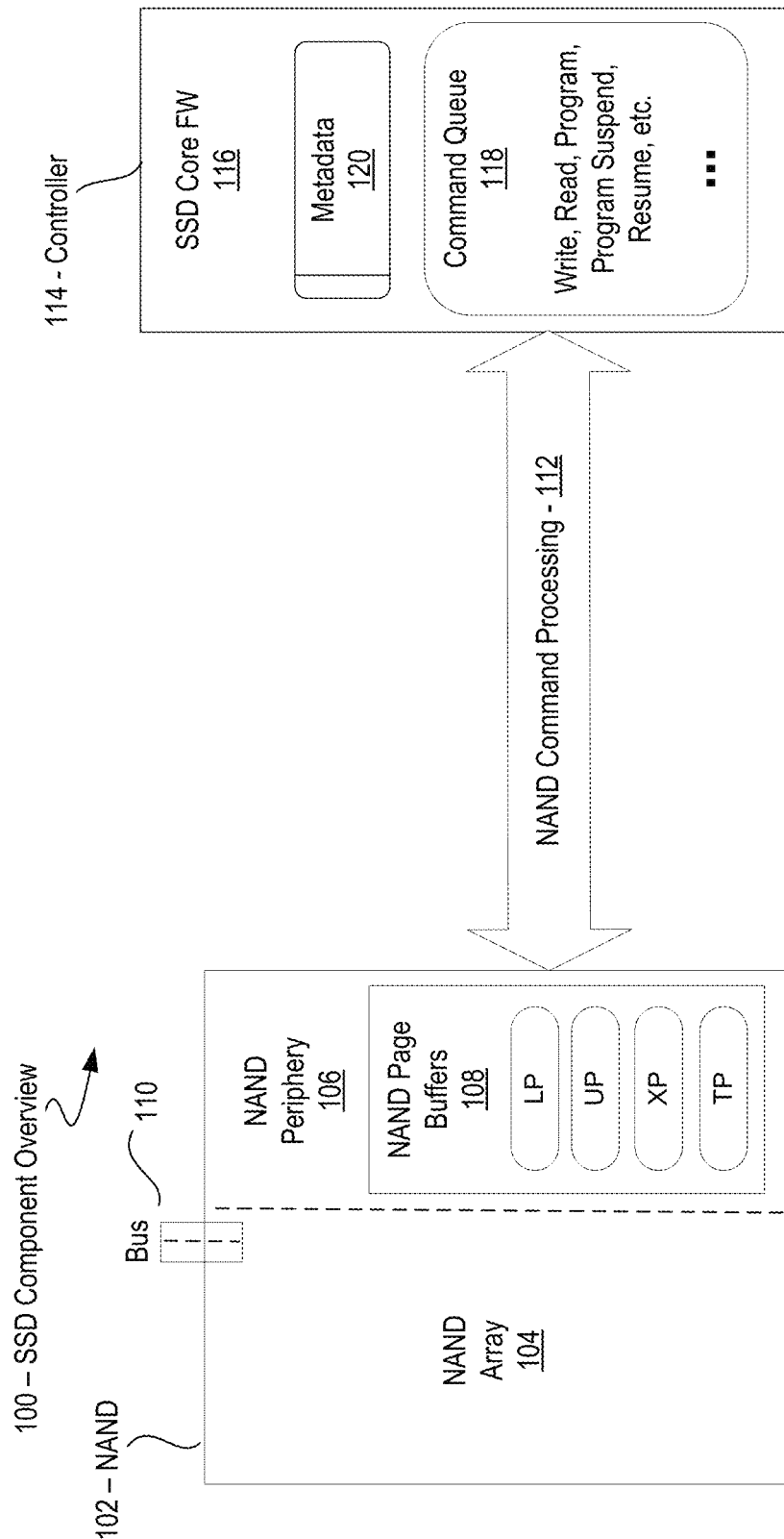
FIG. 1 is a block diagram of selected components of a Solid State Drive (SSD) in which read latency is reduced and read quality of service improved for non-volatile memory in accordance with various examples described herein.

Other features of the described embodiments will be apparent from the accompanying drawings and from the detailed description that follows.

DETAILED DESCRIPTION

A program ("write") operation may be performed in a NAND device in an SSD device, such as an MLC NAND. Program operations may also be performed in other types of NAND devices such as QLC, SLC, three-dimensional (3D) and other types of non-volatile memory.

Because certain NAND devices allow either a single read or single program operation command to access a NAND array at a time, read starvation occurs when the read command(s) wait for the program operation to complete. Read starvation increases read operation latency. As a result of the increase in read operation latency, read quality of service (QoS) is adversely affected by the problem of read starvation.

Read QoS is one of the key metrics used to characterize an SSD that is used in a data center, such as an SSD NAND device. Intel® Rack Scale Design (RSD) is an example of an architecture for a data center that uses SSDs. https://www.intel.com/content/dam/www/public/us/en/documents/guides/architecture-spec-v2-3.pdf.

For a workload in an SSD in a data center (e.g., a data center server), where a read command often follows a write command, and especially on QLC NAND devices. QLC NAND has four bits per cell whereas TLC NAND has three bits per cell. (https://www.micron.com/products/advanced-solutions/qlc-nand). As a result, the time required to program a QLC NAND page increases significantly as compared to TLC NAND. The density of bits per cell can increase read starvation and degrade the read QoS of a data center device to an unacceptable degree.

Program operation latencies may be an order of magnitude larger than read operation latencies. For this reason, NAND devices can leverage a program-suspend-resume (PSR) capability of the NAND device to improve read operation latencies. The PSR capability suspends an in-progress program operation to the NAND array to allow one or more queued read operations to proceed and complete before resuming the suspended program operation. On completion of the one or more queued read operations, the program operation resumes.

A "first order" problem introduced in the above approach is that the number of allowed program operation suspends per program operation (i.e., the number of times a single program command may be suspended) can be limited by the NAND media policy (e.g. QLC NAND policies or 3D NAND policies). For example, certain 3D NAND devices have a NAND policy that limits the number of allowed suspends per program operation. Once the number of allowed program operation suspends are exhausted the program operation may no longer be suspended and the program operation must complete before any new commands are accepted by the NAND device. As a result, all read operations that continue to queue behind this program operation must wait for the program operation to complete resulting in read starvation.

Some enhancements to the PSR capability of an SSD have addressed the problems caused by the PSR process. For example, dual mode PSR leverages an SSD controller timer to measure program progress when a program is interrupted with suspends. The progress is measured from when the program is started or resumed using a time stamp, and dual mode PSR limits the number of suspends using suspend counts based on the measured progress. Doing so allows the SSD firmware to control the progress before a suspend is triggered to reduce the likelihood of longer pending program times resulting from using all of the suspend counts. As another example, progressive PSR implements a program pulse-based scheme to configure granularity of program progress versus using timers. On a NAND device a program operation algorithm is measured in program pulses. For this reason, it can take up to several pulses to complete a program.

While enhanced PSR capabilities like dual mode PSR and progressive PSR can help mitigate the "first order" problem of read starvation behind a program operation, additional read starvation problems can still occur. One problem can occur when a read command collides with one of the pages that are part of the ongoing programming sequence of a program operation (the "Collision" problem). The collision prevents the program operation from being suspended using the PSR capability. Another problem can occur when there are "Pre-Reads" in the programming sequence of the program operation (the "Pre-Read" problem). The Pre-Reads must be completed before a program operation can be suspended using the PSR capability.

To address the foregoing challenges, a storage device capable of storing page data in block-addressable non-volatile memory includes a controller, a command queue and a command logic to reduce read starvation during a program operation on a page of non-volatile memory and improve Read QoS.

FIG. 1 is a block diagram of selected components of an SSD 100 with block-addressable non-volatile memory in which read latency is reduced and Read QoS is improved in accordance with various examples described herein. Specifically, the block diagram illustrates selected components of the SSD 100 for reducing read starvation during a program operation on a page of non-volatile memory, for example QLC NAND or 3D NAND. A NAND device 102 includes a NAND array 104 and a NAND periphery 106 in communication with a bus 110 to a host interface (not shown). The NAND array 104 comprises the physical pages of non-volatile memory. The NAND periphery 106 includes one or more NAND Page Buffers 108, in this example QLC NAND page buffers that can temporarily store four bits, one bit per page (lower "LP", upper "UP", extra "XP" and top "TP"). The page data in the NAND Page Buffers 108 is stored internally, separate from the NAND array 104 physical pages.

In one embodiment, the page buffers are internal NAND latches that hold the value created by an input signal to a targeted location in the NAND array 104 until some other value changes it. Each NAND Page Buffer 108 corresponds to the page's targeted location in the NAND array 104. An SSD controller 114 includes an SSD Core firmware ("FW") 116 containing a Metadata store 120 and a Command Queue 118. The Command Queue 118 is used to queue commands for operating on the NAND Page Buffers 108 of NAND 102, include any one or more commands to write, read, program, program suspend, program resume, etc. During operation, the SSD controller 114 performs NAND command processing 112 in accordance with a command logic, such as command logic embodied in the SSD Core FW 116, and in accordance with the metadata, if any, stored in the Metadata store 120.

Figure 2A:
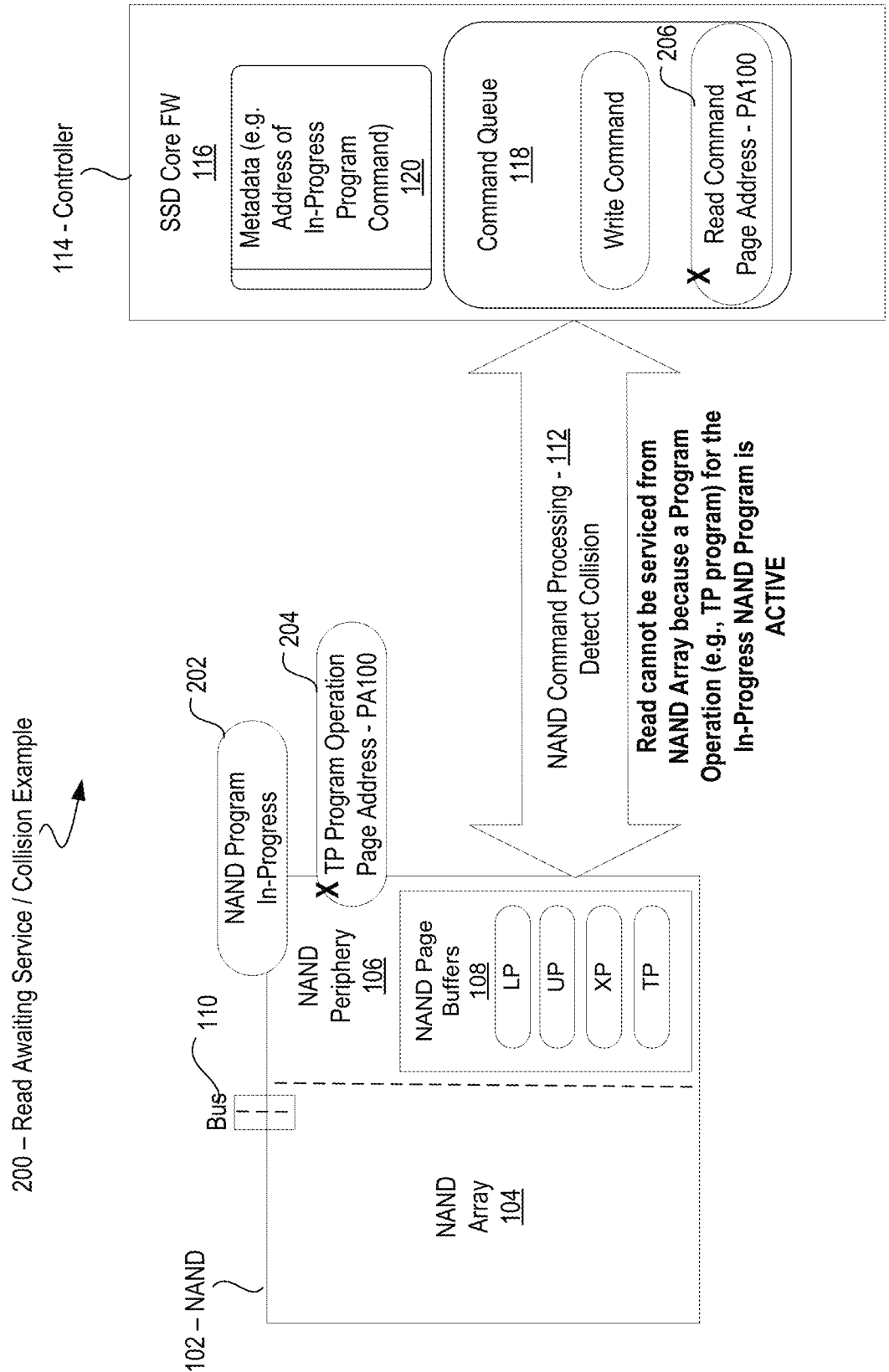
FIGS. 2A-2C are block diagrams illustrating components shown in FIG. 1 in accordance with various examples described herein.
Figure 2B:
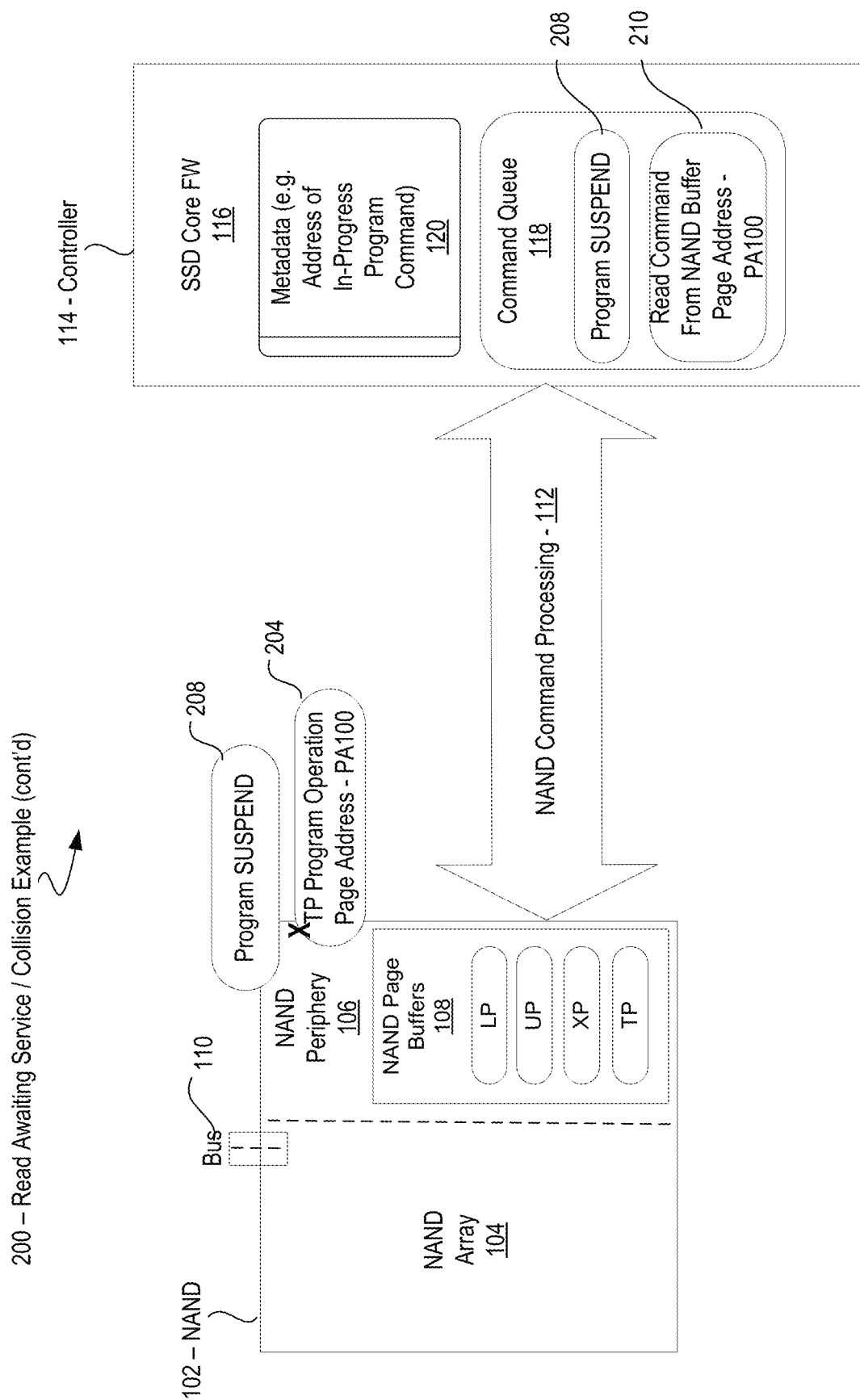
Figure 2C:
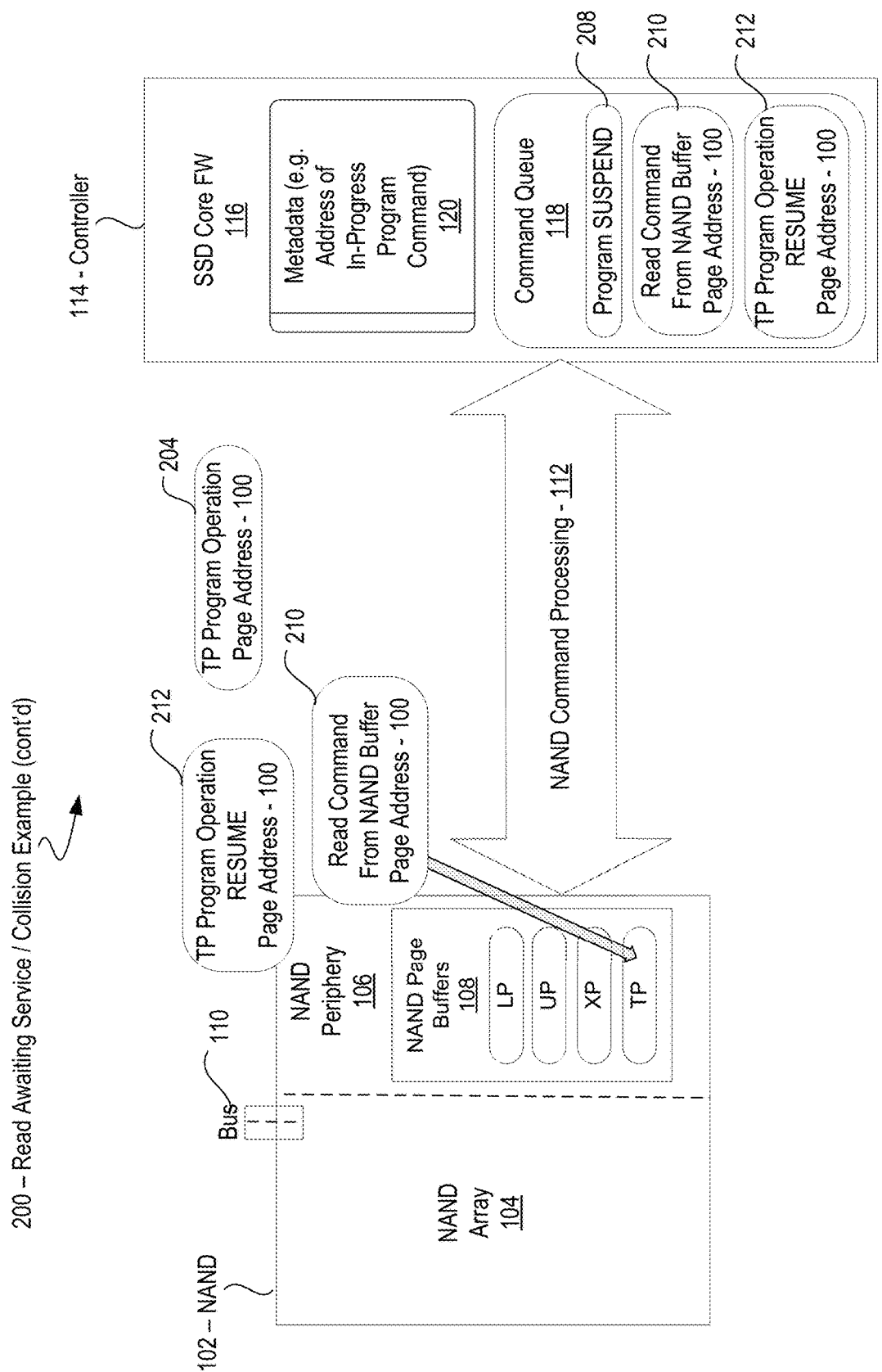

FIGS. 2A-2C are block diagrams illustrating components shown in FIG. 1 in accordance with various examples described herein, in particular the Collision problem. Read requests and write requests are usually random over a span of a logical block address (LBA) range. However, in the data center environment, it is more likely that a read command follows a write command to the same LBA potentially causing a collision.

To solve the collision problem, the controller 114 allows a read operation from the internal NAND page buffers 108, also referred to as Read from NAND Latch, instead of from the targeted program location in the NAND array 104 in accordance with the various examples described herein. While a program is active the page data is stored in the internal NAND latches until the program completes. For this reason, it is possible to suspend the programming of the NAND array and initiate a sequence of operations to read out the data from the correct latch for servicing the colliding read request. As a result, the controller 114 can eliminate or reduce read starvation in cases where a Read command is awaiting service in the command queue if it collides with an in-progress Program operation.

FIG. 2A illustrates a Collision problem example scenario 200 in which the Metadata store 120 contains an address of the command for initiating an in-progress NAND program 202. The Command queue 118 contains a Read Command 206 for page address PA 100. The Read Command 206 collides with an active TP Program Operation 204 on the same targeted location on the NAND array 104, page address PA 100 (the command and the operation flagged with an "X" in the illustrated scenario).

During NAND command processing 112, the controller 114 determines that a NAND Program 202 is in-progress (e.g., after obtaining a status of the in-progress Program Command whose address is stored in Metadata 120). The controller 114 further determines that the in-progress TP Program Operation 204 of the in-progress NAND Program 202 collides with the Read Command 206 in the Command Queue 118 because they both target the same program locations, in this example Page Address PA100 in NAND array 104. For this reason, Read Command 206 cannot be serviced by the NAND array 104 because the TP Program Operation 204 is already active at Page Address PA100 in NAND array 104. As a result, the Read Command 206 is effectively blocked from service until the TP Program Operation 204 (the "write" command) is completed.

The observed read latency for the blocked Read Command 206 is on the order of the in-progress NAND Program 202 completion time. Example read latencies for different types of NAND media are summarized in Table 1. The read latencies vary depending upon the complexity of the Program algorithm and tProg, which represents the NAND Program 202 completion time for each of the different programs (LP, UP, XP and TP). As can be seen the TP program of the Program algorithm takes the longest amount of time to program. For this reason, collisions that occur in target locations that require a TP program operation are especially vulnerable to the adverse effects of read starvation on read latency and Read QoS. Likewise, the target locations that require a TP program operation benefit the most from avoiding the collision as detailed in the description that follows Table 1.

TABLE 1

| Metric | TLC NAND | QLC NAND |
|---|---|---|
| Program algorithm | 2-8 levels | 8-16 levels |
| Read starvation for colliding reads due to tProg | 348 µs (LP program) 5487 µs (UP-XP program) | 2896 µs (LP-UP-XP program) 6653 µs (TP program) |

In one embodiment, to reduce read starvation during a program operation on a page of non-volatile memory, the controller 114 solves the Collision problem by taking advantage of the internal latches that are used to store page data while a NAND Program 202 is in-progress. In a NAND array 104, a NAND gate latches the value created by the input signal to the NAND device and holds that value in an internal latch until some other value changes it. In the illustrated collision example in FIG. 2A, the internal latches are represented by the NAND Page Buffers 108. Thus, to hold the value is to store the page data in the NAND Page Buffers 108. Since the page data is stored in the internal buffers until the NAND Program 202 is completed, the controller 114 can avoid the collision by reading the page data from the correct latch, e.g. TP Page Buffer 108, instead of from the targeted location PA 100 on the NAND array 104.

FIG. 2B illustrates an embodiment in which the controller 114 triggers a Program SUSPEND 208 and circumvents the blocked Read Command 206 by issuing instead a Read Command from NAND Buffer 210 for Page Address PA100. Because the NAND Page Buffer 108 for Page Address PA100 (e.g., TP Page Buffer 108) already contains the internal latch copy of contents of the targeted location at Page Address PA100, the Read Command from NAND Buffer 210 is able to access the page data without accessing the targeted location in the NAND array 104.

In FIG. 2C, after the controller 114 completes the Read Command from NAND Buffer 210, the controller issues a TP Program Operation RESUME command 212 for Page Address PA100. This allows the TP Program Operation 204 that was suspended to resume so that the in-progress NAND Program 202 can be completed without further delay.

In one embodiment, the projected Read QoS improvement that result from Read Command from NAND Buffer 210 and avoiding collisions for TP program operations depends on the workload and the queue depth. For example, for a 4 k block size workload split between 70% random read and 30% random write at a queue depth of QD16, the projected improvement can reduce read latencies by approximately 31% (Table 2).

TABLE 2

Read QoS comparison

| QoS bucket | Baseline | Prototype | Improvement |
|---|---|---|---|
| 99 | 0.99 µs | 0.99 µs | 0% |
| 99.9 | 1.46 µs | 1.45 µs | 0% |

TABLE 2-continued

Read QoS comparison

| QoS bucket | Baseline | Prototype | Improvement |
|---|---|---|---|
| 99.99 | 1.82 µs | 1.82 µs | 0% |
| 99.999 | 2.18 µs | 2.18 µs | 0% |
| 99.9999 | 6.39 µs | 4.62 µs | 31% |

In contrast, for a 4 k block size workload split between 90% random read and 10% random write at a queue depth of QD16, the projected improvement can reduce read latencies by approximately 17% (Table 3).

TABLE 3

Read QoS comparison

| QoS bucket | | Prototype | Improvement |
|---|---|---|---|
| 99 | 0.71 µs | 0.71 µs | 0% |
| 99.9 | 1.27 µs | 1.23 µs | 0% |
| 99.99 | 1.66 µs | 1.63 µs | 0% |
| 99.999 | 1.99 µs | 1.94 µs | 0% |
| 99.9999 | 3.68 µs | 2.41 µs | 17% |

For either type of workload, avoiding collisions for LP, UP and XP program operations can also reduce read latencies, albeit by smaller amounts.

Figure 3A:
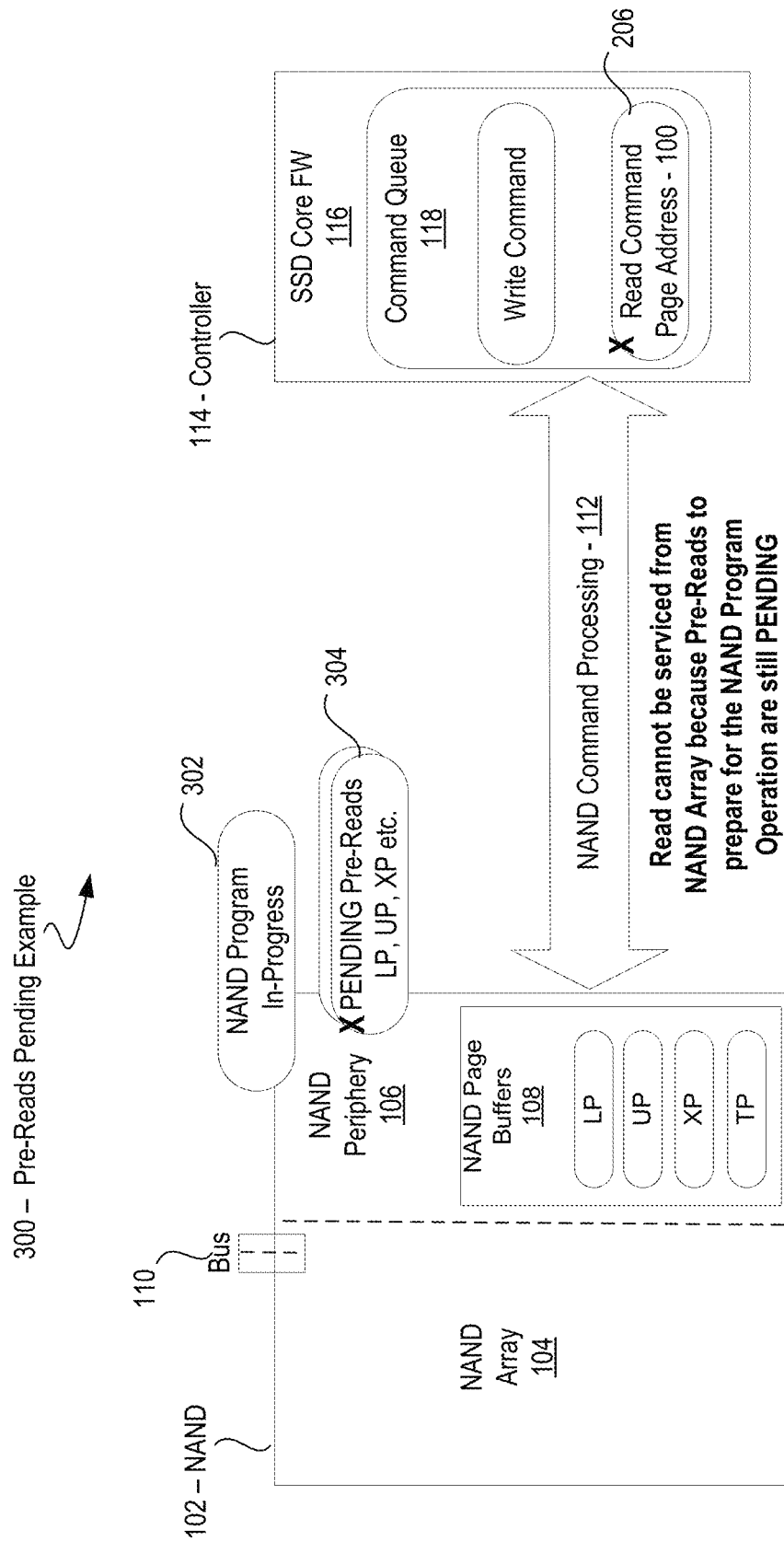
FIGS. 3A-3B are block diagrams illustrating components shown in FIG. 1 in accordance with various examples described herein.

Turning now to the "Pre-Read" problem scenario as illustrated in FIG. 3A, in which the controller 114 determines that the Read Command 206 cannot be serviced from the NAND array 104 because there are PENDING Pre-Reads 304 for one or more of the various target page locations, LP, UP, XP, TP in NAND array 104.

As previously described, TLC and QLC NAND media have multiple pages per wordline. Programing the highest page on the word line (e.g., LP page) requires an external Pre-Read of the lower pages (e.g., TP page). A NAND Program in-progress 302 cannot be suspended until the PENDING Pre-Reads 304 complete and all data is transferred to the NAND array 104. For this reason, a Read Command 206 is blocked before it can issue a program SUSPEND command up until the PENDING Pre-Reads 304 complete. The block can add an overhead on the order of 1 ms to the read latency of the Read Command 206.

For example, the programming algorithm for QLC NAND can be a 16-level program operation that requires pre-read operations on lower page reads. The programming array operation only begins once the pre-read completes and all the data required for the program is transferred to NAND media. The worst case cumulative time before the program operations can start can be denoted as:

Starvation=(Per Plane Pre-Read time+(Per Plane Data Transfer time×2))×(Num. of Planes+Pre-Reads)

Theoretically, the worst case cumulative time can be on the order of ~1 ms (milliseconds) depending on the NAND Media geometry, technology and controller bus speed. Thus, before a program can be suspended a read command remains pending on the dispatch queue for few milliseconds. This increases the observed host read latency and deteriorates the QoS profile. Example read latencies due to pre-read operations for different types of NAND media are summarized in Table 4 where as refers to microseconds.

TABLE 4

| Metric | TLC NAND | QLC | NAND |
|---|---|---|---|
| Program algorithm with Pre-read | 4-8 (Pre-read LP and UP page) | 8-16 (Pre-read LP, UP, XP) | 2-8-16 (Pre-read LP, UP, XP) |
| Read starvation quantification due to pre-read time | 76 μs (tR UP) + 220 μs (tIO) + 49 μs (tR LP) + 220 μs (tIO) | 138 μs (tR LP) + 220 μs (tIO) + 84 μs (tR UP) + 220 μs (tIO) + 56 μs (tR XP) + 220 μs (tIO) | |
| +100 μs PSR time | 565 μs + 100 μs | 938 μs + 100 μs | |

To solve the "Pre-Read" problem, the controller 114 allows a Program Pre-read bypass operation that allows the Read Command 206 to be processed while a "Pre-Read"-enabled multi-stage NAND Program 302 is in flight in accordance with the various examples described herein. In one embodiment, a "Pre-Read"-enabled NAND Program 302 includes the Program Pre-Read bypass operation to allow the Read Command 206 to be serviced between the NAND Program's 302 PENDING "Pre-Reads" 304 and before the in-progress NAND Program's 302 NAND array 104 operation begins. As such, the controller 114 can eliminate or reduce read starvation in cases where a Read command is awaiting service in the Command Queue 118 and the controller cannot trigger program suspend due to PENDING Pre-reads for an in-progress NAND Program.

Figure 3B:
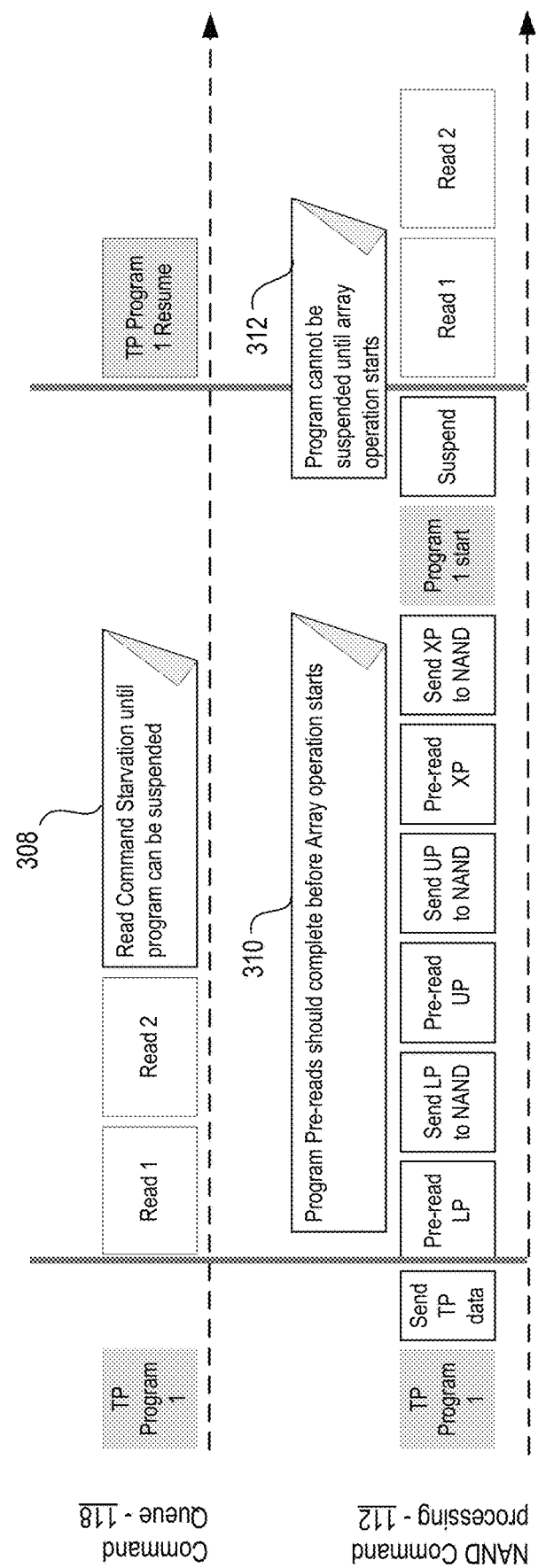
Figure 3C:
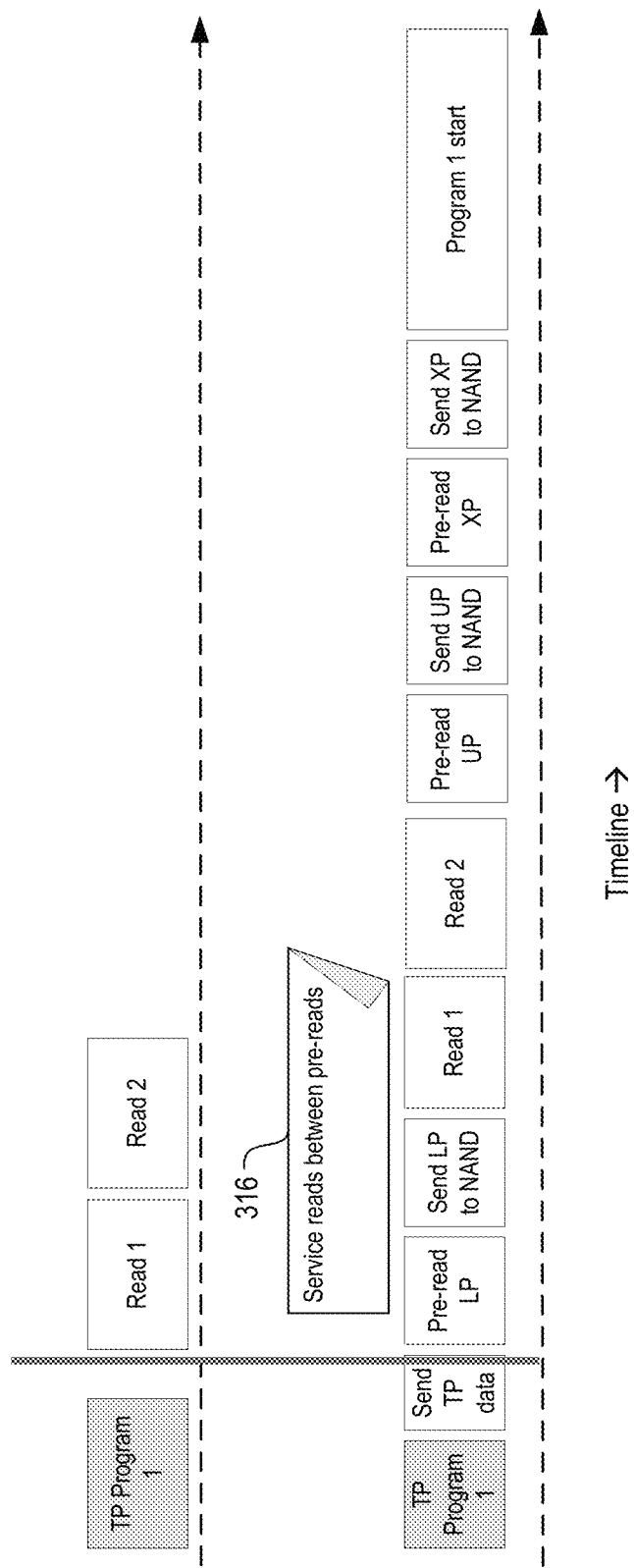
FIG. 3C is a timeline diagram illustrating selected components shown in FIG. 1 in accordance with various examples described herein.

FIGS. 3B-3C illustrate example timelines of the NAND command processing 112 of Read commands in a Command Queue 118 without enabling the "Pre-Read" Bypass (FIG. 3B), and with enabling the "Pre-Read" Bypass (FIG. 3C). In the illustrated scenario of FIG. 3B, a TP Program 1 operation is in-progress when a Command Queue 118 receives two Read commands, Read 1 and Read 2. The two Read commands are blocked 308 until in-progress Program 1 can be suspended. NAND Command Processing 112 has already commenced sending TP data to the NAND array 104 for the in-progress Program 1 and must continue to service Pre-Reads for the LP, UP and XP pages in preparation for the Program 1 NAND array operation. After all of the Pre-Reads are serviced 310, the Program 1 NAND array operation starts. Only then can the in-progress Program 1 be suspended 312 to allow NAND Command Processing 112 to process the Read 1 and Read 2 commands that were previously blocked. After Read 1 and Read 2 commands begin processing, then the TP Program 1 NAND array operation can resume.

FIG. 3C illustrates the same scenario, but this time with a Pre-Read Bypass operation enabled for the in-progress TP Program 1 in accordance with the examples described herein. As shown in the timeline, the queued Read 1 and Read 2 commands that were previously blocked are instead serviced between the Pre-Reads 316, in this case serviced between the Pre-Read for the LP pages and the Pre-Read for the UP pages. Allowing the Read 1 and Read 2 commands in Command Queue 118 to bypass the PENDING Pre-Reads of an in-progress Program reduces read operation latency, thereby improving Read QoS.

In one embodiment the number of Read commands in the Command Queue 118 that are allowed to bypass the Pre-Reads is based on a threshold. The threshold can be configured in accordance with the type of non-volatile memory and/or other operating characteristics of the storage device.

The threshold for the number of reads that can be serviced in between Pre-Reads can be determined experimentally. In one embodiment, the threshold is a function of the tRead (total read time) and the tProg (total program time). The threshold can be the number of reads that can be serviced while allowing the program command to make progress. In a typical embodiment, the threshold is determined based on the tRead and tProg and is usually a static number for products.

For example, in a 90% read and 10% write workload of 4K block size, where 100 commands are queued per second, 90 reads and 10 writes. If the command queue can hold 100 4K size commands, then a worst case scenario is to service 900 reads without making progress on the first program command. In that case the system would deadlock as the writes are being starved out. This worst case scenario can be prevented by experimentally tuning the threshold for the number of reads that are allowed to be serviced with a Pre-Read Bypass feature.

In one embodiment, the projected Read QoS improvement for enabling Pre-Read Bypass operations for an in-progress NAND Program depends on the type of non-volatile memory, the program algorithm, workload and queue depth. For example, using a 2-8-16 program algorithm and comparing outcomes against a default 4-16 program algorithm that includes Pre-Reads, test results show that the Read QoS can be improved by upwards of 36% when the overhead of waiting for Pre-Reads is reduced or eliminated. The projected improvements for workloads of 4K block size random reads of queue depth 1 for a storage device using QLC non-volatile memory are shown in Table 5.

TABLE 5

Read QoS comparison

| QoS bucket | Current value | Best case improvement | Percent improvement |
|---|---|---|---|
| 99.99 | 700 μs | 400 μs | 43% |
| 99.999 | 950 μs | 600 μs | 42% |
| 99.9999 | 1100 μs | 700 μs | 36% |

Figure 4A:
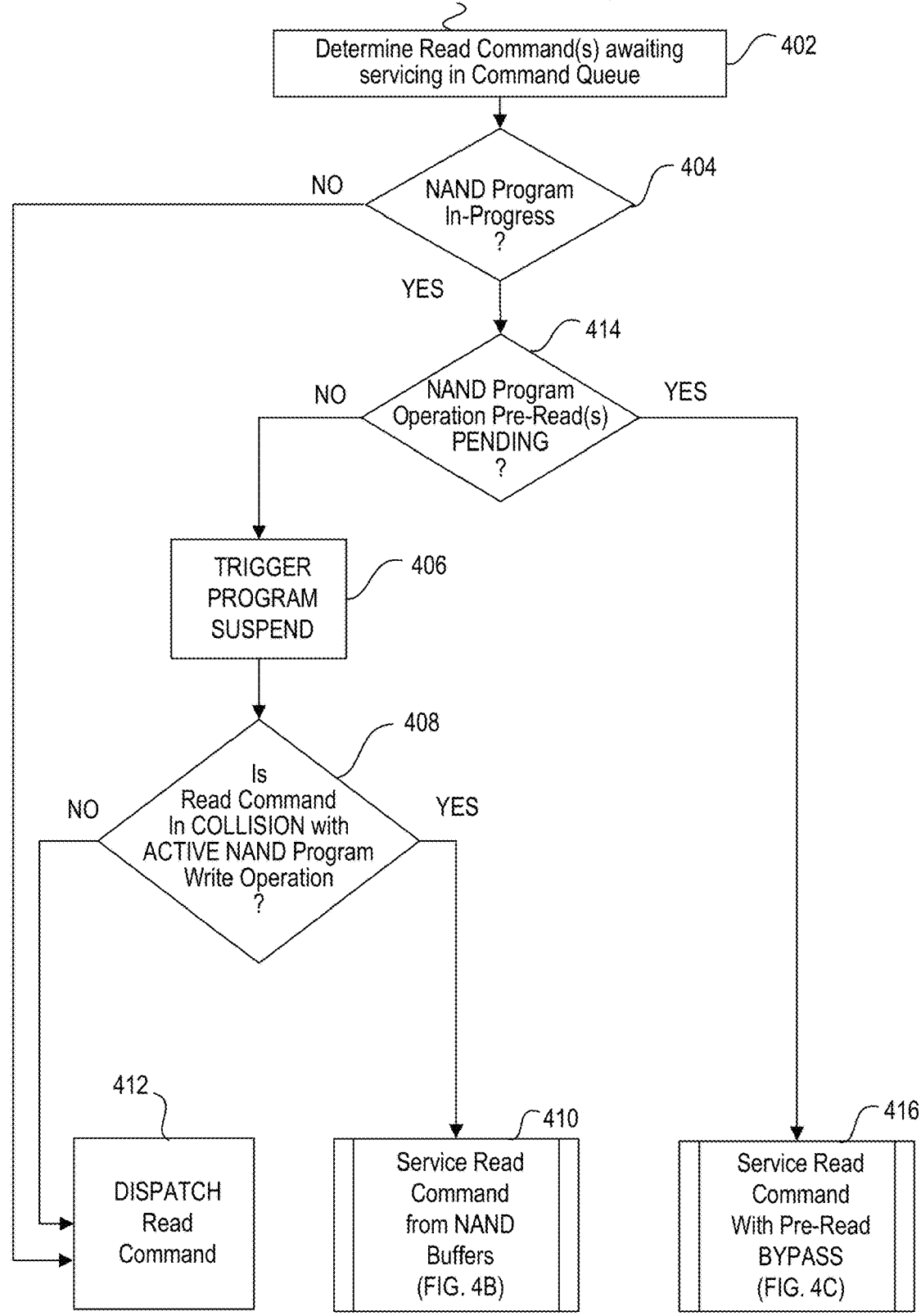
FIGS. 4A-4C is a process diagram illustrating process flows to reduce read latency and improve read quality of service for non-volatile memory in accordance with various examples described herein.
Figure 4B:
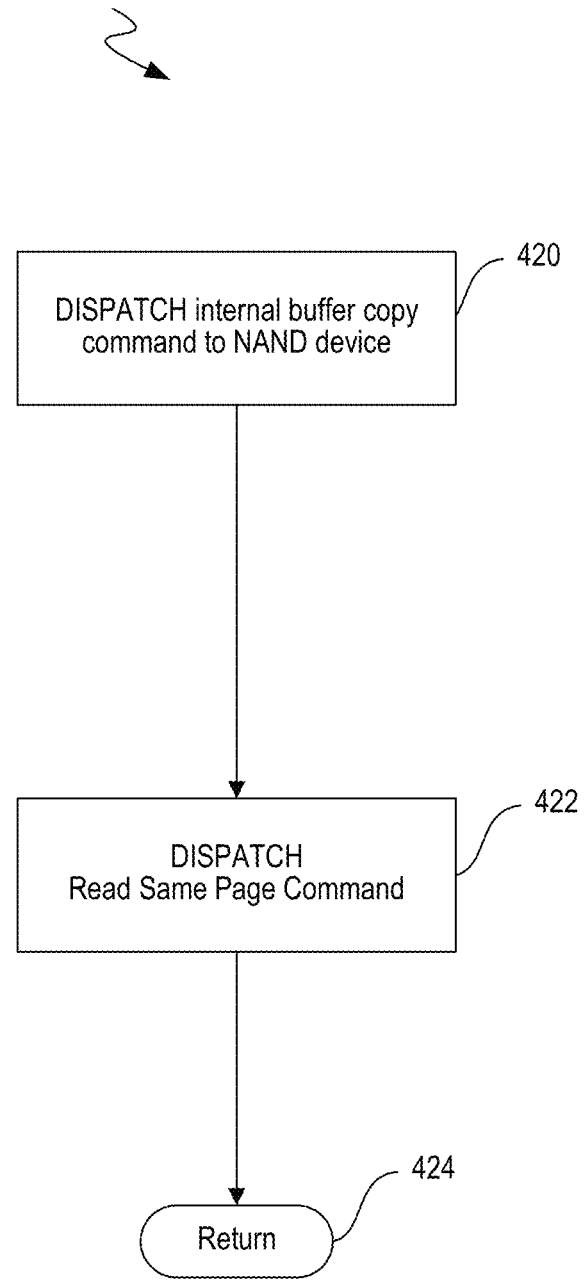
Figure 4C:
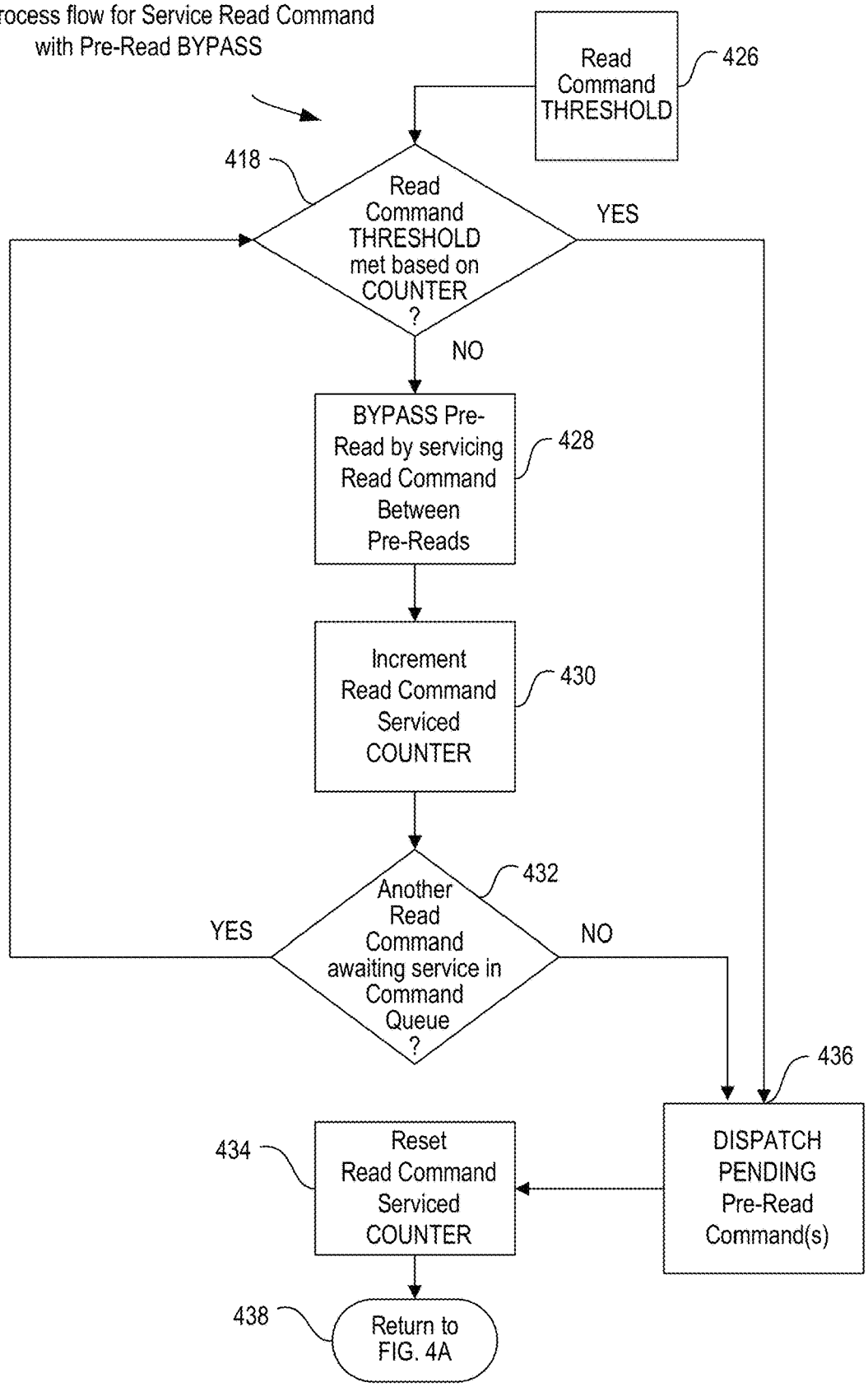

FIGS. 4A-4C are process diagrams illustrating process flows to eliminate or reduce read latency and improve Read QoS for non-volatile memory in accordance with various examples described herein. In FIG. 4A, an embodiment of the process 400 begins at block 402 when the controller determines that a Read command is awaiting service in the command queue. At decision block 404, the controller determines whether a NAND program is in-progress. If not, then the Read command can simply be dispatched at block 412. However, if there is a NAND Program in-progress, then at decision block 414 the controller next determines whether there are PENDING Pre-Read(s).

In one embodiment, if at decision block 414 the controller determines that there are PENDING Pre-reads for the in-progress NAND program, then the controller enables the servicing of the Read commands with the Pre-Read Bypass process 416 (FIG. 4C). The Pre-Read Bypass process 416 does not affect the NAND program status because the program operation data is saved in internal program buffers that are separate from the internal buffers from which the Read commands are serviced. For this reason, it is not necessary to trigger a program suspend of the in-progress NAND program before commencing the Pre-Read Bypass process 416.

In one embodiment, if there are no PENDING Pre-reads for the in-progress NAND program, then the controller continues at block 406 and triggers a program suspend of the in-progress NAND program in preparation for collision detection. The controller, at decision block 408, detects whether there is a collision between the Read command and any active NAND programming (write) operations that may have begun as part of the in-progress NAND program. The controller detects the collision by comparing the page address of the active NAND programming operation with the page address of the Read command(s) awaiting service in the command queue and determining that the page addresses are in the same targeted location of the NAND array 104. In one embodiment, a collision is detected when a Read command collides with a same linked page group, e.g. (lower "LP", upper "UP", extra "XP" and top "TP"). In one embodiment, if no collision is detected, then the controller simply dispatches the Read command at block 412 for NAND command processing using the existing PSR (program-suspend-resume) capabilities of the storage device. However, if a collision is detected, then the controller services the Read command using the Read from the internal NAND buffers process 410 (FIG. 4B).

In FIG. 4B, an embodiment of the process 410 to service Read commands from NAND buffers includes, at 420, the controller to dispatch an internal buffer copy command to the NAND device. The internal buffer copy command obtains the internal latch copy of the page address specified in the Read command rather than reading from the page address at the targeted location in the NAND array. At 422, the controller dispatches a Read same page command to read from the internal NAND buffer which contains the internal latch copy of the page address. The process 410 concludes at 424 and control returns to FIG. 4A.

FIG. 4C illustrates an embodiment of the process 416 to service Read commands with Pre-Read BYPASS enabled for the in-progress NAND Program. If so, then the process 416 obtains the current Read command THRESHOLD value 426. In one embodiment, the value of the Read command THRESHOLD can be configured per workload on the NAND device. At 418, the controller first checks whether the Read command THRESHOLD 426 has been met based on the current value of the Read command serviced COUNTER (incremented at 430). If so, then the Pre-Read BYPASS operation is skipped since the maximum number of Read commands has already been serviced. Instead, the controller at 436 dispatches any PENDING Pre-Read command(s) for the in-progress NAND Program. At 434 the controller resets the Read command serviced COUNTER (in preparation for the next invocation of Pre-Read BYPASS 416) before returning, at 438, to FIG. 4A.

If, however, the Read command THRESHOLD 426 has not been met, then the Pre-Read BYPASS operation continues. At 428, the controller proceeds with the BYPASS Pre-Read operation by servicing the Read command in between the Pre-Reads. At 430, the controller increments the Read Command serviced COUNTER to reflect the servicing of the Read command. The controller at 432 determines whether another Read command is awaiting service in the command queue. If so, then the controller returns to the beginning of process 416, and at 418 continues processing until the Read command THRESHOLD is met. If there are no more Read commands awaiting service in the command queue, then the controller at 436 dispatches any PENDING Pre-Read command(s) for the in-progress NAND Program. At 434 the controller resets the Read command serviced COUNTER (in preparation for the next invocation of Pre-Read BYPASS 416) before returning, at 438, to FIG. 4A. In one embodiment, the Read command THRESHOLD 430 can be configured to allow as many Read commands to bypass the PENDING Pre-Read command(s) as is sufficient to reduce read latency and improve Read QoS, balanced against the requirements of the affected in-progress NAND Program operations.

Figure 5:
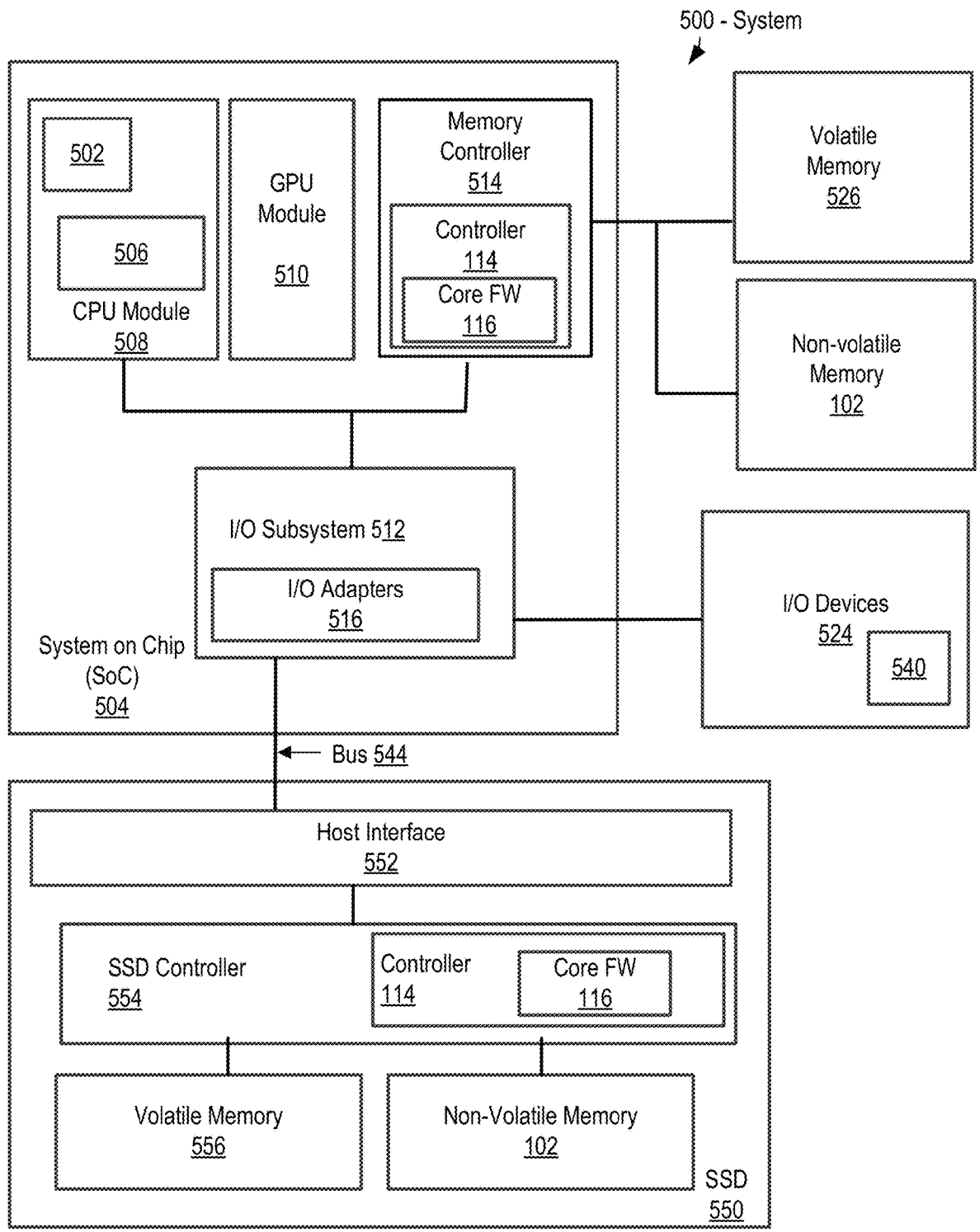
FIG. 5 is a block diagram of an embodiment of a computer system in which read latency is reduced and read quality of service is improved for non-volatile memory in accordance with various examples described herein.

FIG. 5 is a block diagram of an embodiment of a computer system 500 having a memory controller 514 that includes a controller 114 and other components, such as those described in FIG. 1, to reduce read latency and improve Read QoS in accordance with various example embodiments described herein. Computer system 500 can correspond to a computing device including, but not limited to, a server, a workstation computer, a desktop computer, a laptop computer, and/or a tablet computer.

The computer system 500 includes a system on chip (SOC or SoC) 504 which combines processor, graphics, memory, and Input/Output (I/O) control logic into one SoC package. The SoC 504 includes at least one Central Processing Unit (CPU) module 508, a memory controller including the aforementioned controller 114, and a Graphics Processor Unit (GPU) 510. In other embodiments, the memory controller 514 including controller 114 and other components, such as described in FIG. 1, can be external to the SoC 504. The CPU module 508 includes at least one processor core 502, and a level 2 (L2) cache 506.

Although not shown, each of the processor core(s) 502 can internally include one or more instruction/data caches, execution units, prefetch buffers, instruction queues, branch address calculation units, instruction decoders, floating point units, retirement units, etc. The CPU module 508 can correspond to a single core or a multi-core general purpose processor, such as those provided by Intel® Corporation, according to one embodiment.

The Graphics Processor Unit (GPU) 510 can include one or more GPU cores and a GPU cache which can store graphics related data for the GPU core. The GPU core can internally include one or more execution units and one or more instruction and data caches. Additionally, the Graphics Processor Unit (GPU) 510 can contain other graphics logic units that are not shown in FIG. 5, such as one or more vertex processing units, rasterization units, media processing units, and codecs.

Within the I/O subsystem 512, one or more I/O adapter(s) 516 are present to translate a host communication protocol utilized within the processor core(s) 502 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 516 can communicate with external I/O devices 524 which can include, for example, user interface device(s) including a display and/or a touch-screen display 540, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)). Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 516 can also communicate with a solid-state drive ("SSD") 550 which includes an SSD controller 554, a host interface 552 and non-volatile memory 204 that includes one or more non-volatile memory devices. The SSD controller 554 can communicate with volatile memory 556 and non-volatile memory 102 in the SSD 550. The SSD controller 554 can include the controller 114 and other components, such as those described in FIG. 1, to reduce read latency and improve Read QoS in accordance with various example embodiments described herein.

The memory controller 514 in the System on Chip (SOC) 504 can communicate with volatile memory 526 and non-volatile memory 102 in system 500. A non-volatile memory (NVM) device 102 is a memory whose state is determinate even if power is interrupted to the device. In one embodiment, the NVM device 102 can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device 102 can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The I/O adapters 516 can include a Peripheral Component Interconnect Express (PCIe) adapter that is communicatively coupled using the NVMe (NVM Express) over PCIe (Peripheral Component Interconnect Express) protocol over bus 544 to a host interface 552 in the SSD 550. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org.

The PCIe standards are available at www.pcisig.com. Volatile memory 526 is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

Any description herein of an operating system includes software that manages computer hardware and software including memory allocation and access to I/O devices. Examples of operating systems include Microsoft® Windows®, Linux®, iOS® and Android®.

In the foregoing description examples were presented along with accompanying drawings to illustrate the various embodiments of reducing read starvation during a program operation on a page of non-volatile memory to improve Read QoS. The description and drawings are illustrative of the various embodiments and are not to be construed as limiting. Numerous specific details were described to provide a thorough understanding of the various embodiments. However, in certain instances, well-known or conventional details were not described in order to provide a concise discussion.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Flow diagrams, such as FIGS. 4A-4C, provided examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Additional example implementations are as follows:

Example 1 is a method, system, apparatus or computer-readable medium for an integrated circuit comprising a memory controller including a command queue to queue commands issued to pages of block-addressable non-volatile memory and a command logic to reduce a read starvation of a read command in the command queue during a program operation on a page of the block-addressable non-volatile memory, the read starvation a result of any of the read command in collision with the program operation on a same page of the block-addressable non-volatile memory, and the read command queued during pre-reads for the program operation.

Example 2 is the method, system, apparatus or computer-readable medium of Example 1 wherein to reduce the read starvation of the read command in collision with the program operation on the same page of the non-volatile memory, the command logic is to suspend the program operation, cause the read command to read from an internal buffer of page data instead of the same page of the block-addressable non-volatile memory, resume the program operation upon completion of the read from the internal buffer of page data, and wherein the same page includes a page in a same linked page group of the block-addressable non-volatile memory.

Example 3 is the method, system, apparatus or computer-readable medium of Example 2 wherein to cause the read command to read from the internal buffer of page data instead of the same page of the block-addressable non-volatile memory the command logic is to dispatch an internal buffer copy command to copy the page of the block-addressable non-volatile memory to the internal buffer of page data and dispatch a read same page command to read from the internal buffer of page data.

Example 4 is the method, system, apparatus or computer-readable medium of Example 2 wherein the internal buffer is an internal latch in which the page data is stored until the program operation is completed.

Example 5 is the method, system, apparatus or computer-readable medium of Example 2 wherein the command logic to reduce the read starvation of the read command in the command queue during pre-reads for the program operation is to bypass pre-reads for the program operation and service one or more read commands between the pre-reads until a bypass threshold is met.

Example 6 is the method, system, apparatus or computer-readable medium of Example 5 wherein the bypass threshold is a threshold number of read commands allowed to bypass pre-reads for the program operation, the threshold number including a configured number of read commands allowed to bypass pre-reads per workload in a solid state drive (SSD) containing the non-volatile memory.

Example 7 is the method, system, apparatus or computer-readable medium of Example 6, wherein the threshold number of read commands allowed to bypass pre-reads for the program operation is reached when any of the threshold number of read commands are bypassed and the pre-reads for the program operation are completed.

Example 8 is the method, system, apparatus or computer-readable medium of Example 1, wherein non-volatile memory includes any of a Quad-Level Cell NAND and the page includes any of upper lower, extra and top and a Tri-Level Cell NAND and the page includes any of upper, lower and top.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory controller comprising:
   a command queue to queue commands issued to pages of block-addressable non-volatile memory;
   a command logic to reduce a read starvation of a read command in the command queue during a program operation on a page of the block-addressable non-volatile memory, the read starvation a result of any of:
   the read command in collision with the program operation on a same page of the block-addressable non-volatile memory, the same page including a page in a same linked page group of the block-addressable non-volatile memory, and
   the read command queued during pre-reads for the program operation; and
   wherein to reduce the read starvation of the read command in collision with the program operation on the same page of the non-volatile memory the command logic to:
   suspend the program operation,
   cause the read command to read from an internal buffer of page data instead of the same page of the block-addressable non-volatile memory, including to dispatch an internal buffer copy command to copy the page of the block-addressable non-volatile memory to the internal buffer of page data and to dispatch a read same page command to read from the internal buffer of page data, and
   resume the program operation upon completion of the read from the internal buffer of page data.

2. The memory controller of claim 1, wherein the internal buffer is an internal latch in which the page data is stored until the program operation is completed.

3. A memory controller comprising:
   a command queue to queue commands issued to pages of block-addressable non-volatile memory;

a command logic to reduce a read starvation of a read command in the command queue during a program operation on a page of the block-addressable non-volatile memory, the read starvation a result of any of:
the read command in collision with the program operation on a same page of the block-addressable non-volatile memory, the same page including a page in a same linked page group of the block-addressable non-volatile memory, and
the read command queued during pre-reads for the program operation;
wherein to reduce the read starvation of the read command in collision with the program operation on the same page of the non-volatile memory, the command logic is to:
suspend the program operation;
cause the read command to read from an internal buffer of page data instead of the same page of the block-addressable non-volatile memory, and
resume the program operation upon completion of the read from the internal buffer of page data; and
wherein to reduce the read starvation of the read command queued during pre-reads for the program operation is to:
bypass pre-reads for the program operation, and
service one or more read commands between the pre-reads until a bypass threshold is met.

4. The memory controller of claim 3, wherein the bypass threshold is a threshold number of read commands allowed to bypass pre-reads for the program operation, the threshold number including a configured number of read commands allowed to bypass pre-reads per workload in a solid state drive (SSD) containing the non-volatile memory.

5. The memory controller of claim 4, wherein the threshold number of read commands allowed to bypass pre-reads for the program operation is reached when any of:
the threshold number of read commands are bypassed; and
the pre-reads for the program operation are completed.

6. The memory controller of claim 1, wherein non-volatile memory includes any of:
a Quad-Level Cell NAND and the page includes any of upper lower, extra and top; and
a Tri-Level Cell NAND and the page includes any of upper, lower and top.

7. A method, comprising:
in a processor of a block-addressable memory device:
queueing read commands issued to pages of a non-volatile memory in a command queue of the block-addressable memory device;
reducing a read starvation of a read command in the command queue during a program operation on a page of the non-volatile memory, the read starvation resulting from any of:
the read command in collision with a program operation on a same page of the non-volatile memory, and
the read command queued during pre-reads for a program operation;
detecting the read command in collision with the program operation, including determining that the read command and the program operation are addressed to the same page of the non-volatile memory, the same page including a page in a same linked page group of the non-volatile memory; and
wherein reducing the read starvation resulting from the read command in collision with the program operation on the same page of the non-volatile memory includes:
suspending the program operation,
causing the read command to read from an internal buffer of page data instead of the same page of the non-volatile memory, including:
dispatching an internal buffer copy command to copy the same page of the non-volatile memory to the internal buffer of page data, and
dispatching a read same page command to read the page data from the internal buffer; and
resuming the program operation upon completion of the read command.

8. The method of claim 7, wherein the internal buffer is an internal latch in which the page data is stored until the program operation completes.

9. A method comprising:
in a processor of a block-addressable memory device:
queueing read commands issued to pages of a non-volatile memory in a command queue of a block-addressable memory device;
reducing a read starvation of a read command in the command queue during a program operation on a page of the non-volatile memory, the read starvation resulting from any of:
the read command in collision with a program operation on a same page of the non-volatile memory, and
the read command queued during pre-reads for a program operation;
detecting the read command in collision with the program operation, including determining that the read command and the program operation are addressed to the same page of the non-volatile memory, the same page including a page in a same linked page group of the non-volatile memory;
wherein reducing the read starvation resulting from the read command in collision with the program operation on the same page of the non-volatile memory includes:
suspending the program operation,
causing the read command to read from an internal buffer of page data instead of the same page of the non-volatile memory, and
resuming the program operation upon completion of the read command; and
wherein reducing the read starvation for the read command queued during pre-reads for the program operation includes:
bypassing pre-reads for the program operation; and
servicing one or more read commands between the pre-reads until a bypass threshold is met.

10. The method of claim 9, wherein the bypass threshold is a maximum number of read commands allowed to bypass pre-reads for the program operation, including a configured number of read commands allowed to bypass pre-reads per workload in a solid state drive (SSD) containing the non-volatile memory.

11. The method of claim 10, wherein the maximum number of read commands allowed to bypass pre-reads for the program operation is reached when any of:
the maximum number of read commands are bypassed; and
the pre-reads for the program operation are completed.

12. The method of claim 7, wherein:
the non-volatile memory is any of:
a Quad-Level Cell NAND and the page includes any of upper lower, extra and top,
a Tri-Level Cell NAND and the page includes any of upper, lower and top; and the block-addressable memory device is a solid state drive (SSD).

13. A system comprising:
a block-addressable non-volatile memory; and
a memory controller communicatively coupled to the block-addressable non-volatile memory, the memory controller comprising:
a command queue to queue commands issued to pages of the block-addressable non-volatile memory;
a command logic to reduce a read starvation of a read command in the command queue during a program operation on a page of the block-addressable non-volatile memory, the read starvation a result of any of:
the read command in collision with the program operation on a same page of the block-addressable non-volatile memory, and
the read command queued during pre-reads for the program operation; and
wherein to reduce the read starvation of the read command queued during pre-reads for the program operation, the command logic further to:
bypass pre-reads for the program operation, and
service one or more read commands between pre-reads until a bypass threshold is met, the bypass threshold set to a maximum number of read commands allowed to bypass pre-reads for the program operation, the bypass threshold including a configured number of read commands allowed to bypass pre-reads per workload in a solid state drive (SSD) containing the non-volatile memory.

14. The system of claim 13 wherein, to reduce the read starvation of the read command in collision with the program operation on the same page of the block-addressable non-volatile memory, the command logic further to:
suspend the program operation;
cause the read command to read from an internal buffer of page data instead of the same page of the block-addressable non-volatile memory, including to dispatch:
an internal buffer copy command to copy the page of the block-addressable non-volatile memory to the internal buffer of page data, and
a read same page command; and
resume the program operation upon completion of the read command.

15. The system of claim 13, wherein:
the block-addressable non-volatile memory comprises a block-addressable memory device, including any of:
a Quad-Level Cell NAND and the page is one of upper lower, extra and top; and
a Tri-Level Cell NAND and the page is one of upper, lower and top.

16. The memory controller of claim 3, wherein non-volatile memory includes any of:
a Quad-Level Cell NAND and the page includes any of upper lower, extra and top; and
a Tri-Level Cell NAND and the page includes any of upper, lower and top.

17. The method of claim 9, wherein
the non-volatile memory is any of:
a Quad-Level Cell NAND and the page includes any of upper lower, extra and top,
a Tri-Level Cell NAND and the page includes any of upper, lower and top; and
the block-addressable memory device is a solid state drive (SSD).

* * * * *